United States Patent [19]
Bright

[11] Patent Number: 5,622,274
[45] Date of Patent: Apr. 22, 1997

[54] MOLDED CONTAINER CLOSURE

[75] Inventor: Stephen A. Bright, Troy, Ohio

[73] Assignee: Electra Form, Inc., Vandalia, Ohio

[21] Appl. No.: 456,773

[22] Filed: Jun. 1, 1995

[51] Int. Cl.⁶ .................................................... B65D 41/24
[52] U.S. Cl. .......................... 215/246; 215/275; 215/320;
220/201; 220/319; 156/69
[58] Field of Search ...................... 215/246, 274,
215/275, 901, 320; 220/201, 319, 320,
359, 615, 618, 619, 214; 206/497; 156/69

[56] References Cited

U.S. PATENT DOCUMENTS

| | | | |
|---|---|---|---|
| 3,402,874 | 9/1968 | Sternau | 215/246 X |
| 3,531,013 | 9/1970 | Hammes . | |
| 3,532,244 | 10/1970 | Yates, Jr. . | |
| 3,792,797 | 2/1974 | Mrusek et al. | 220/319 X |
| 3,826,404 | 7/1974 | Rowe et al. | 220/615 X |
| 3,955,699 | 5/1976 | Amberg et al. | 215/246 |
| 4,171,062 | 10/1979 | Allen et al. | 220/319 X |
| 4,227,616 | 10/1980 | Lecinski, Jr. et al. | 215/246 |
| 4,625,890 | 12/1986 | Galer . | |
| 4,782,976 | 11/1988 | Kenyon, 2nd. | 215/246 X |

Primary Examiner—Allan N. Shoap
Assistant Examiner—Nathan Newhouse
Attorney, Agent, or Firm—Locke Reynolds

[57] ABSTRACT

A closure is intended for use on a container having an opening defined by a rim portion and a finish including a ledge situated below the rim portion. The closure includes a central body portion sized to cover the container opening and a peripheral portion adapted to contact the rim portion of the container. A plurality of tabs are unitarily fixed to the peripheral portion, each tab including a tang adapted to engage the ledge of the container finish. Each tab also includes a thinned, stressed portion between the tang and the rim portion which is reactive to an application of heat to cause shortening of the tab length. The thinned portion also acts as a hinge to permit flexural displacement of the tab with respect to the body portion. The closure when applied to a container is completed by a band which encompasses the tabs, the band also being reactive to an application of heat to cause contraction of the band to insure continued engagement between the ledge and tangs. The application of heat to the band is preferably simultaneous with the application of the heat to the tabs thereby causing a secure hermetic seal to occur between the container rim and the peripheral portion of the closure.

7 Claims, 3 Drawing Sheets

MOLDED CONTAINER CLOSURE

The present application is directed to closures for containers of foods, beverages, and other liquid or viscous products, and particularly to methods for making such closures of molded polymeric resins having selected portions which are shrinkable to engage a container feature.

Numerous containers, enclosures for those containers have been designed which are intended for use with food and beverage products. Many of the closures are of the threaded variety. Such closures used on containers having large mouth openings often present significant problems due to the large torques required to open the container.

Other closures have employed flanges or tangs intended to snap below a ledge or similar feature on a container. Generally, such snap-on closures are difficult to mold and require a tool for removal of the cap from the container. Ready availability of the tool to allow removal of the cap is not always assured and manipulation of the tool is often difficult.

It is an object of the present invention to provide a closure assembly which is easily opened, but which clearly indicates such opening to prevent product tampering. Another object of the present invention is to provide a molded plastic non-threaded closure which can be used on food and beverage products and which require a secure hermetic seal. Another object of the present invention is to provide a closure designed to be secured to the container using a thermal process, but at a temperature well below the melt temperature of the polymers of which both the container and closure are made.

Another object of the present invention is to provide a closure which includes locking features which assure that the container enclosure will not be easily dislodged even if the container is subjected to rough handling during transport or warehousing Another object of the present invention to provide a container and closure which may be easily and economically manufactured.

SUMMARY OF THE INVENTION

To achieve these and other objects, the present invention employs a closure which is intended for use on a container having an opening defined by a rim portion and a finish including a ledge situated below the rim portion. The closure includes a central body portion sized to cover the container opening. The closure includes a peripheral portion adapted to contact the rim portion of the container. A plurality of tabs are unitarily fixed to the peripheral portion, each tab including a tang adapted to engage the ledge of the container finish. Each tab also includes a thinned, stressed portion between the tang and the rim portion which is reactive to an application of heat to cause shortening of the tab length. The thinned portion also acts as a hinge to permit flexural displacement of the tab with respect to the body portion. The closure when applied to a container is completed by a band which encompasses the tabs, the band also being reactive to heat to cause contraction of the band to insure continued engagement between the ledge and tangs. The application of heat to the band is preferably simultaneous with the application of the heat to the tabs thereby causing a secure hermetic seal to occur between the container rim and the peripheral portion of the closure.

The closure can be formed by an injection molding process wherein the central body portion intended to cover the container opening and the peripheral portion adapted to contact the rim portion of a container as well as the unitary tabs are all molded of a single unit of plastic at a single point in time. Stress is then introduced into each tab between the tang and the peripheral portion. The stress introduction is achieved by reheating a portion of each tab between the tang and the peripheral portion to a temperature above the minimum orientation temperature, but less than the glass transition temperature of the polymeric resin forming the closure followed by a lengthening of the tab through a relative movement between two portions of the injection mold. The band adapted to encompass the tabs is formed in a separate process by known means to insure its innate property of being reactive to an application of heat to cause contraction of the band.

One feature of the present invention is a closure having tabs intended to engage a ledge on a container finish, the tabs being reactive to an application of heat to cause shortening of the tab length. The heat reactive portion has the advantage of insuring maintenance of a seal between the container and closure until the tabs are released from their ledge engagement. The heat reactive feature of the tabs is achieved by the introduction of stress into the tabs as a part of the molding process. This feature has the advantage of not requiring any separate manufacturing process or step to achieve this heat reactive feature. The heat reactive feature of the tabs can be coupled with a heat reactive feature of a tamper indicating band. Advantageously, only a single heat application process is used in the application of the closure to the container whereby both the closure and the tamper evident features are secured in place by the single heat application. The use of a tamper evident band in this manner insures both mechanical cooperation between the container closure as well as the conventional security engendered by a tamper evident band thus achieving a dual function for the single element.

Desirably, the tamper evident band is easily severed either through the use of previously weakened areas or through the use of a sharp implement such as a knife or scissors. Upon removal of the tamper evident band, the tabs are preferably biased outward away from engagement with the ledge thereby releasing the closure from the container. The tabs themselves can be used as easy handles for quick and effortless removal of the closure from the container. These and other features and advantages of the present invention will become apparent to those skilled in the art upon consideration of the following description of a preferred embodiment representing the best mode presently contemplated. The description refers to the accompanying drawings.

DESCRIPTION OF A PREFERRED EMBODIMENT

Figure 1:
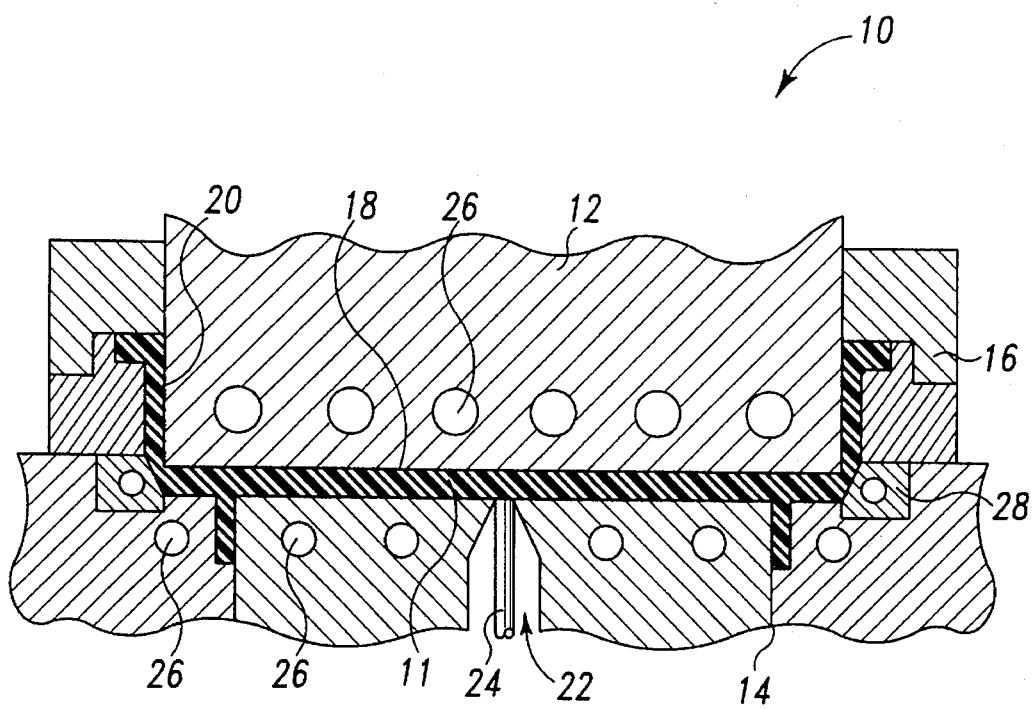
FIG. 1 is a cross-sectional view of an injection mold for forming a closure in accordance with the present invention.
Figure 2:
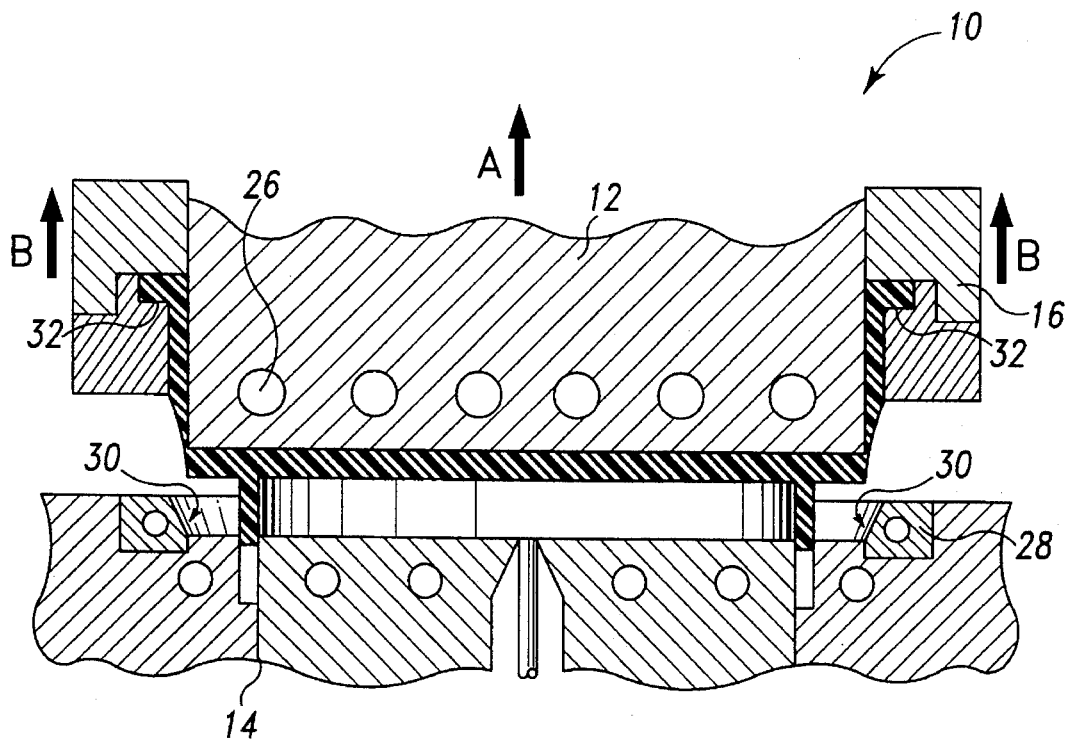
FIG. 2 is a cross-sectional view similar to FIG. 1 showing the stretching of the tabs of the closure as the core is removed from the cavity.

A mold 10 for manufacturing a closure 11 in accordance with the present invention is illustrated in FIGS. 1 and 2. The mold 10 is comprised generally of a mold core 12, a mold cavity 14, and a split ring element 16. The core 12 has an end surface 18 which defines the top surface of the closure. The core 12 also has a perimetral outer surface 20 which defines the outer surface of the tabs of the closure.

The cavity 14 includes a gate 22 through which molded plastic may be introduced to form the closure 11. The gate 22 is controlled in the conventional way by a gate valve of which stem 24 is illustrated. Both the core 12 and cavity 14 include cooling channels 26 for circulating cooling fluid through the core and cavity to cool the plastic injected into the mold.

The cavity unit 14 also includes a heating element 28 situated in the perimeter of the mold. The heating element includes a surface 30 which contacts the perimeter and tab portions of the closure 11 as the closure is being molded. The function of the heating unit 28 is to apply a limited amount of heat to that limited region of the closure so that, while the remainder of the closure is cooled to a temperature below the minimum orientation temperature for the resin forming the closure, the region in contact with surface 30 of heating element 28 will be brought to a temperature above the minimum orientation temperature but below the glass transition temperature of the polymeric resin. With the resin forming the closure is at this temperature, the mold moves from the closed position shown in FIG. 1 to the partially open position shown in FIG. 2.

Figure 3:
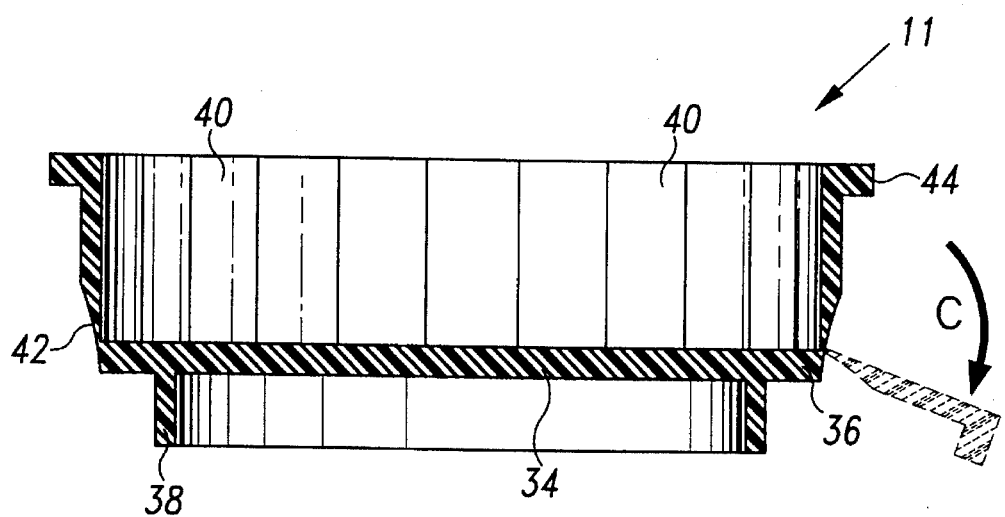
FIG. 3 is the same sectional view of the completed closure showing one of the tabs being bent from its original molded position toward its position of use.

The movement which occurs between FIGS. 1 and 2 is one in which the core 12 moves in direction A with respect to the cavity 14 while at the same time the split ring portion 16 moves a greater distance B. The split ring portion of the mold includes a step 32 which defines a tang on the closure tabs and which permits the ring portion 16 to stretch the tabs at a position adjacent the perimeter of the closure 11 thus orienting the polymer forming the tabs in that region. The orientation induces a stress into the tabs which makes the tabs reactive to a subsequent application of heat so that upon such heat application the tab will shorten in length. The split ring 16 and core 12 are maintained in the same relative position with respect to each other as shown in FIG. 2 as the closure is further withdrawn from cavity 14 and the stretched portion of the tabs is cooled by continued application of cooling liquid through channels 26 in the core 12. The core 12 is then removed from the split ring 16 and the split ring 16 releases the molded closure which then appears as shown in FIG. 3.

The closure 11 includes a central body portion 34 and a peripheral portion 36. A collar 38 depends downward from the central body portion and is adapted to be received within the mouth of the container opening. The collar portion 38 can be viewed as defining the conjunction between the central body portion 34 and perimetral portion 36. A plurality of tabs 40 are fixed unitarily to the peripheral portion 36 by a stressed portion 42 which has been axially oriented to be heat reactive. The tabs 40 each include a tang 44 which is adapted to engage a ledge of a container finish to which the closure is applied. The tabs 40 are essentially in an inoperative position as shown in FIG. 3 and must be bent from their original molded position as shown in FIG. 3 in solid line outward and downward in the direction C to achieve the position shown in FIGS. 4 and 5.

Figure 4:
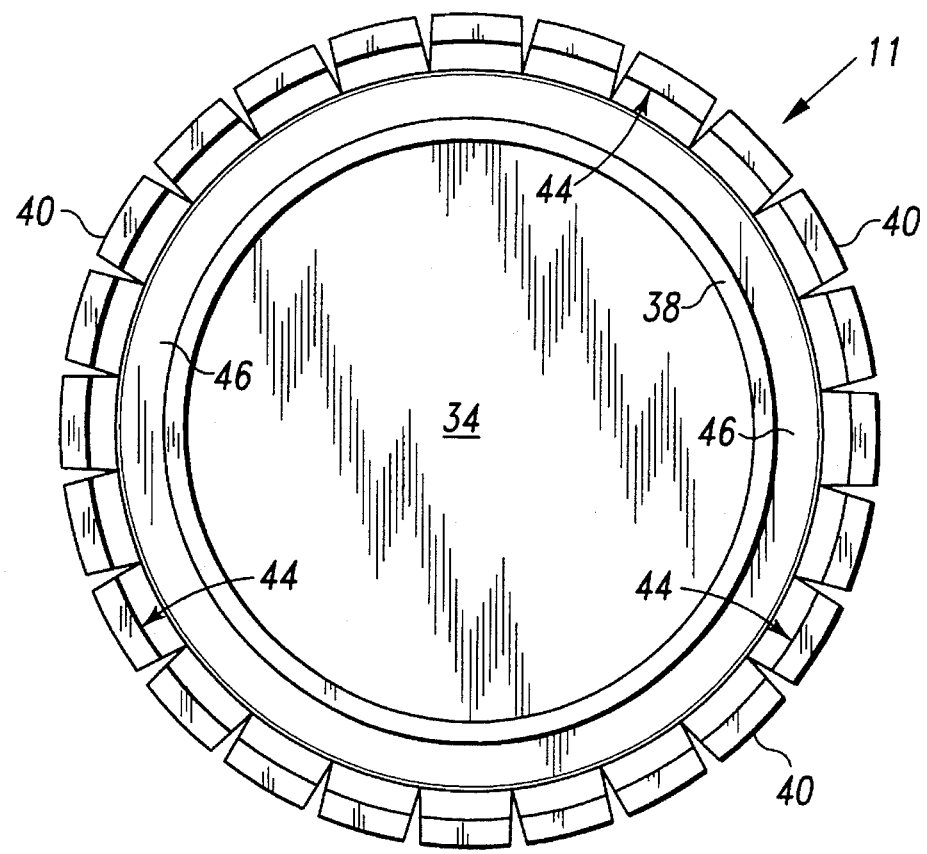
FIG. 4 is a bottom plan view of the closure showing the addition of a sealing ring.
Figure 5:
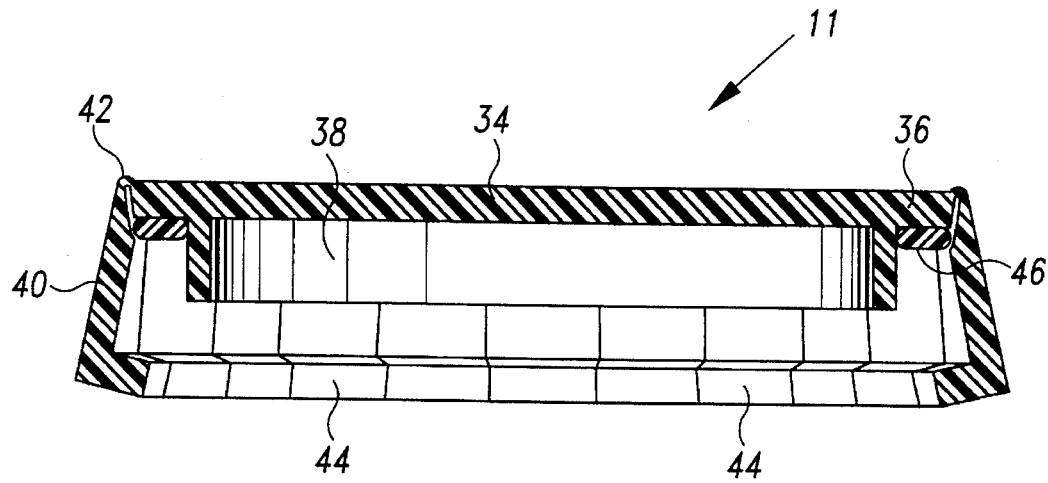
FIG. 5 is a sectional view of the closure prior to application to a container.

It will be seen from FIGS. 4 and 5 that a sealing means in the form of an elastomeric ring 46 is applied to the peripheral portion 36 of the closure 11. The elastomeric ring 46 is intended to conformably engage the lip or rim portion of the container to which the closure is applied. FIGS. 3, 4 and 5 illustrate a closure with 24 tabs, but the number of tabs is a matter of design choice that will be apparent to those skilled in the art.

Figure 6:
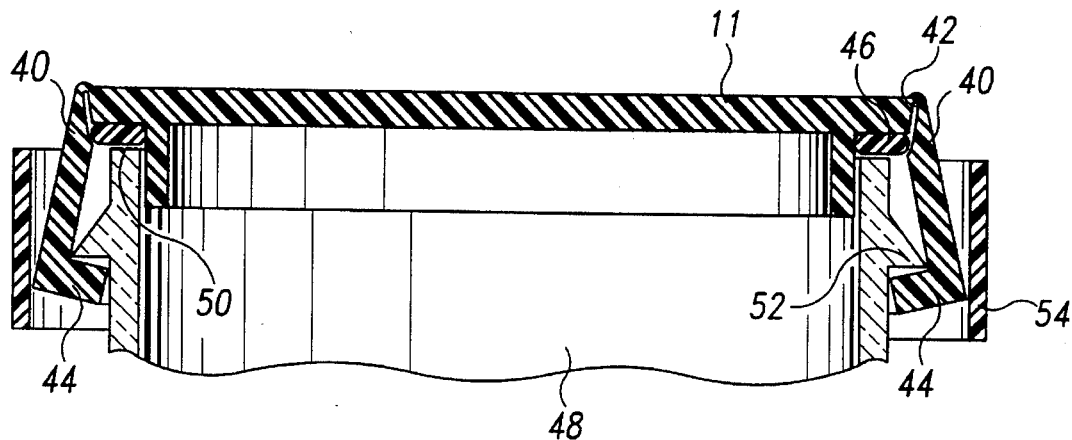
FIG. 6 is a sectional view of the closure resting on top of a container and surrounded by a heat shrinkable, tamper evident band.
Figure 7:
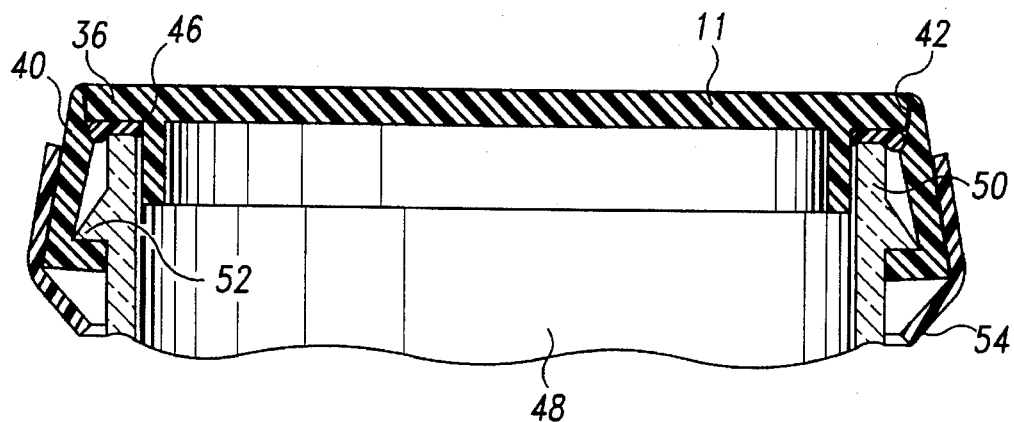
FIG. 7 is a sectional view of the closure following the heat application causing contraction of the stress portion of the tabs and shrinking of the tamper evident band.

The application of the closure 11 to the mouth of a container 48 is shown in FIGS. 5 and 7. The container 48 has an opening defined by a rim portion 50 surrounded by a finish which includes a ledge 52. The tangs 44 of tabs 40 protrude under the ledge 52 as the elastomeric sealing ring 46 engages the rim portion 50 of the container mouth. A continuous circumferential band 54 is positioned to surround the tabs 40 as shown in FIG. 6. The band 54 is reactive to any application of heat in a known manner of heat shrink plastics.

Upon application of heat to the band 54, the band will shrink from the position shown in FIG. 6 to that shown in FIG. 7. The applied heat is preferably also directed on the stressed portions 42 of the tabs 40 causing the stressed portions of tabs to shorten in length thus applying a downward pressure by the closure on the elastomeric sealing ring 46 effectively sealing the mouth of the container 48. The shortening of stressed portions 42 also causes a small outward force to be applied to the tabs 40 by the peripheral portion 36 of the closure. The force is insufficient to overcome the significant pressure applied by the shrunken band 54 as long as the band 54 remains whole.

Upon severance of the band 54, the slight pressure acting between the perimeter 36 and the tabs 40 causes the tabs to splay outward away from engagement with ledge 52 thus facilitating removal of the closure from the mouth of the container 48. The shortened length of the tabs 40 together with the quick release achieved through severance of the tamper evident band 54 assures little opportunity for one to conceal the access to the container. It will be appreciated that a closure of this type is particularly useful on single use containers such as individual servings of fruit juice and the like.

While the present invention has been described in relation to the illustrated preferred embodiment, various changes, modifications, and additions may be made without departing from the spirit and scope of this invention as defined by the following claims.

What is claimed is:

1. A closure for use on a container having an opening defined by a rim portion and a finish including a ledge situated below the rim portion, the closure including a central body portion sized to cover the container opening and including a peripheral portion for contacting the rim portion of the container, a plurality of tabs fixed unitarily to the peripheral portion, each tab including a tang for engaging the ledge of the container finish, each tab also including a longitudinally stressed portion between the tang and the rim portion reactive to an application of heat to cause shortening of the stressed portion of the tab.

2. The closure of claim 1 wherein the longitudinally stressed portion of each tab comprises a thinned portion forming a hinge to permit flexural displacement of each tab with respect to the central body portion.

3. The closure of claim 1 further comprising an integral inner collar portion depending from the central body portion to be received within said container opening.

4. The closure of claim 1 further comprising sealing means applied to said peripheral portion for sealingly engaging said rim portion.

5. The closure of claim 1 further comprising a band encompassing the tabs, the band being reactive to an application of heat to cause contraction of the band to ensure continued engagement between said ledge and said tangs.

6. A closure for use on a container having an opening defined by a rim portion and a finish including a ledge situated below the rim portion, the closure including a central body portion sized to cover the container opening including an integral inner collar portion depending from the central body portion to be received within said container opening and a peripheral portion for contacting the rim portion of the container, a plurality of tabs fixed unitarily to the peripheral portion, each tab including a tang for engaging the ledge of the container finish, each tab also including a stressed portion between the tang and the rim portion reactive to an application of heat to cause shortening of the stressed portion of the tab and thus the overall tab length.

7. A closure for use on a container having an opening defined by a rim portion and a finish including a ledge situated below the rim portion, the closure including a central body portion sized to cover the container opening and including a peripheral portion for contacting the rim portion of the container, a plurality of tabs fixed unitarily to the peripheral portion, each tab including a tang for engaging the ledge of the container finish, each tab also including a stressed portion between the tang and the rim portion reactive to an application of heat to cause shortening of the stressed portion of the tab and a band for encompassing the tabs, the band being reactive to an application of heat to cause contraction of the band to ensure continued engagement between said ledge and said tangs.

* * * * *